United States Patent
Weber et al.

[15] 3,698,558
[45] Oct. 17, 1972

[54] ANTI-POLLUTION DEVICE FOR REMOVING DEBRIS FROM LIQUID

[72] Inventors: Roland E. Weber, 363 Main Street, Holyoke, Mass. 01040; Carl J. Zimmermann, Federal Street, Belchertown, Mass. 01007

[22] Filed: April 29, 1971

[21] Appl. No.: 138,589

[52] U.S. Cl. ................210/256, 210/262, 210/298, 210/304, 210/313, 210/332
[51] Int. Cl. ......................B01d 21/26, B01d 29/42
[58] Field of Search......210/112, 256, 261, 262, 294, 210/298, 304, 305, 312, 313, 332, 409, 391

[56] References Cited

UNITED STATES PATENTS

| | | | |
|---|---|---|---|
| 1,750,922 | 3/1930 | Cheakas et al. | 210/537 |
| 2,843,270 | 7/1958 | Acosta | 210/540 X |
| 2,565,343 | 8/1951 | Benham | 210/537 X |
| 971,013 | 9/1910 | Smith, Jr. | 210/304 X |
| 1,176,732 | 3/1916 | Bowser | 210/304 |
| 2,487,769 | 11/1949 | Ebert et al. | 210/332 |
| 2,592,983 | 4/1952 | Hildebrandt | 210/261 X |
| 3,006,475 | 10/1961 | Wood | 210/112 |
| 3,389,795 | 6/1968 | Wintzer | 210/112 |
| 3,510,006 | 5/1970 | Chefsson | 210/540 X |
| 3,570,670 | 3/1971 | Endo et al. | 210/112 |

FOREIGN PATENTS OR APPLICATIONS

| | | | |
|---|---|---|---|
| 1,019,618 | 2/1966 | Great Britain | 210/535 |

*Primary Examiner*—John Adee
*Attorney*—Leonard S. Michelman

[57] ABSTRACT

This invention is concerned with an anti-pollution device, and particularly a filter for removing deleterious particles and matter from liquids. The invention herein comprises a system and mechanism whereby liquid is caused to flow into a tank. The tank is so arranged that it has an upper area where the floating particles will rise and flow off into a designated receptacle. The heavy particles are caused to flow into a lower area in the tank and the flow of the liquid is slowed down by passing through helicoid ribs so that the heavy particles will have time to fall into a lower area and then into a chute in the bottom of the tank. Then particles are fed by a worm mechanism into a container whereby when enough of the particles have been deposited, the slurry of the particles will be caused to create a pressure so as to open up a valve. They then exit into a designated receptacle. The liquid itself flows into a chamber within the tank and through filtering means removing substantially all of the deleterious particles therefrom and out into a designated receptacle. The filtering means comprise two separate species. In one embodiment the liquid is slowed down by being fed into helicoid ribs around the inner chamber and is further slowed down by fins attached to the bottom of the chamber and then caused to flow upwardly into the chamber and out through an opening. In another species the liquid flows through diatomaceous earth into filter screen tubes and then passes into an upper chamber and out through an opening.

9 Claims, 5 Drawing Figures

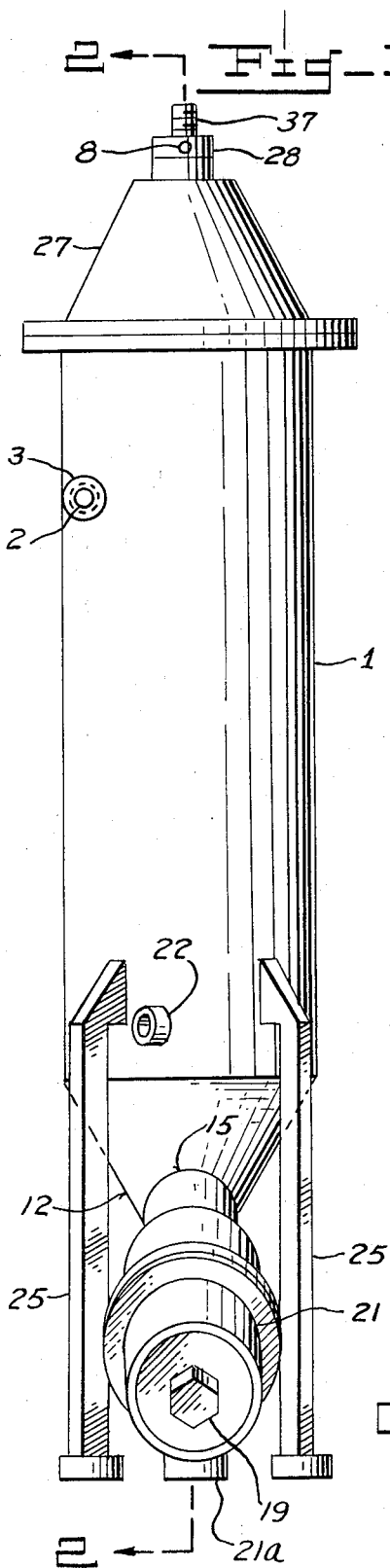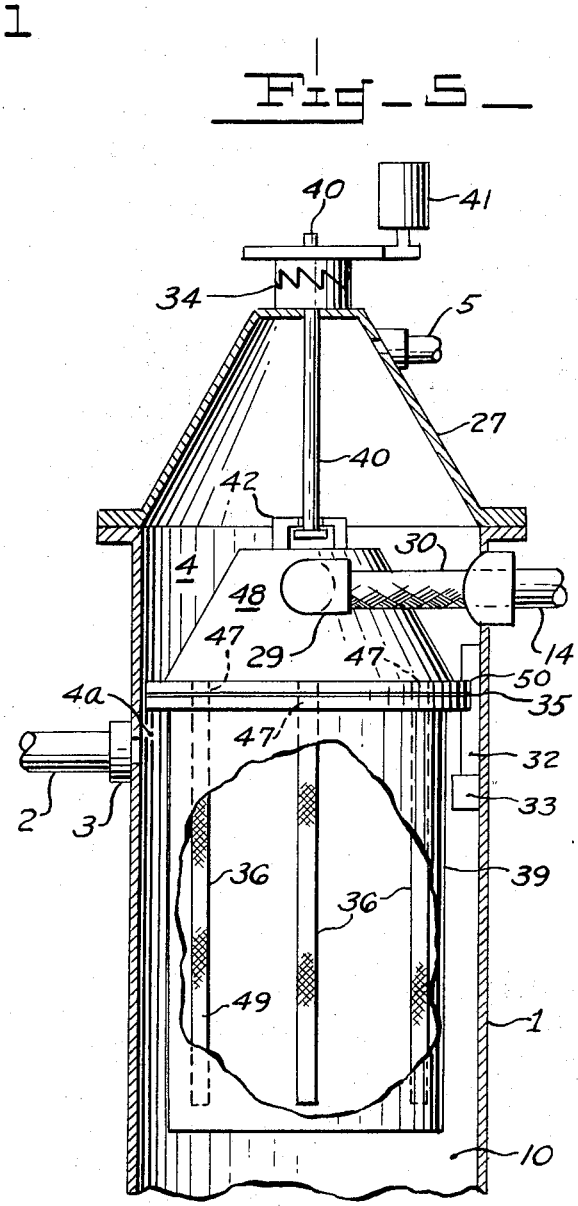
Fig.1
Fig.2
Roland E. Weber
Carl J. Zimmermann
INVENTORS

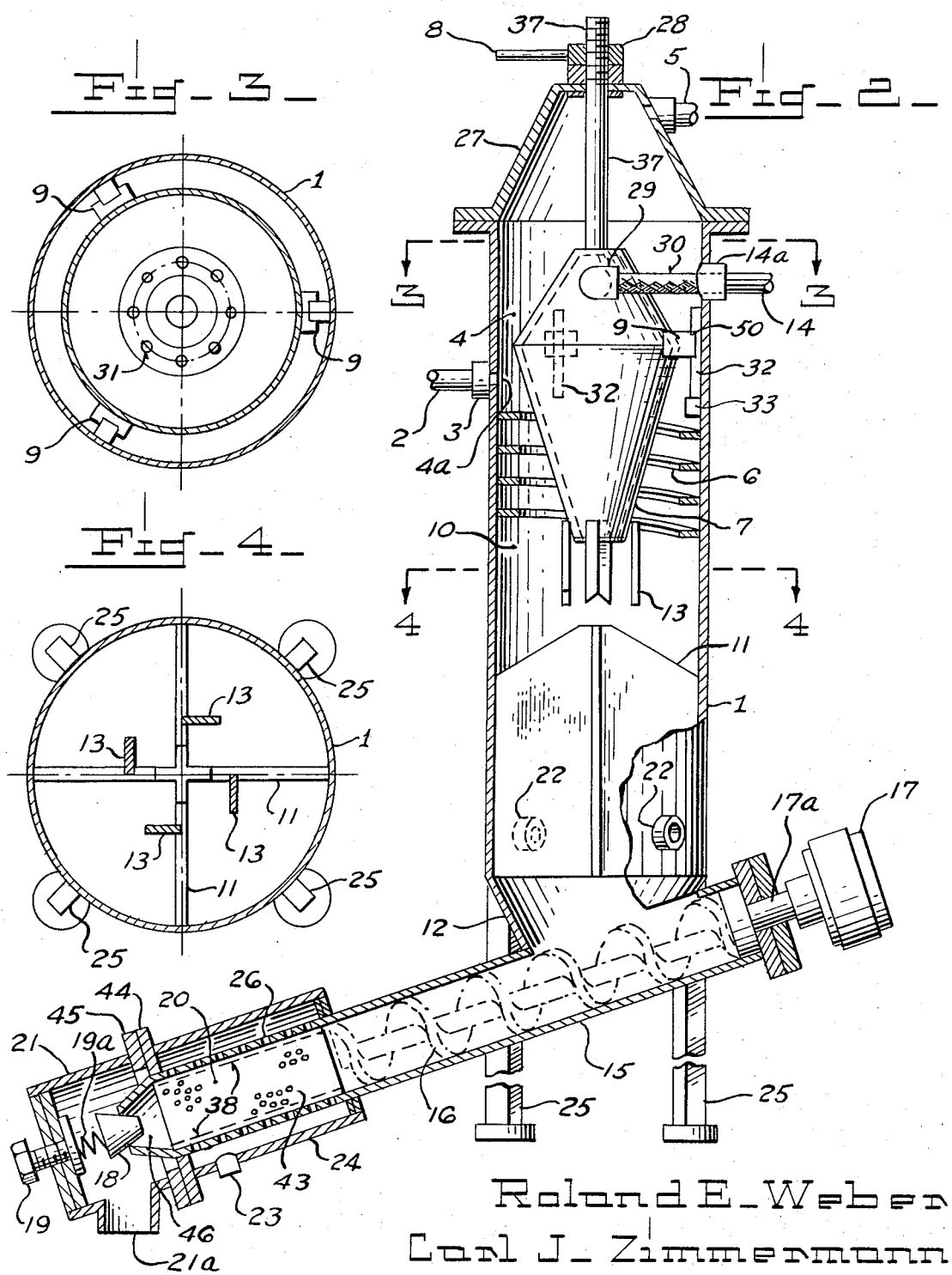

ANTI-POLLUTION DEVICE FOR REMOVING DEBRIS FROM LIQUID

This invention is concerned with a device that will eliminate waste and aid in anti-pollution.

In industry there are many types of uses of water and other liquids that carry deleterious matter which deleterious matter is usually dumped or deposited into a river, brook, creek or stream causing pollution of that natural resource.

It is a primary purpose of this invention to provide a filtering system for preventing pollution of natural resources.

It is yet another object of the within invention to provide a filtering system that is new and novel by decelerating in a filter the flow of fluid and thereby causing pollution type particles to be separated from the fluid.

It is a still further object of the within invention to provide a means in this novel system to carry off the separated particles into a device whereby they are formed into a dehydrated mass or slurry, and then removed in a simple manner so that they may be disposed of without polluting the environment.

It is also an object of the within invention to provide a filter that can not only be used as an anti-pollution device but also can be used as a stage in a multiple unit system of filters whereby it is desired to have the filtrated use of a liquid whereby the liquid may be reclaimed for re-use.

It is still another purpose of this invention to provide a filtration means whereby the organic particles that are removed from the liquid reduce the use of oxygen in the liquid which is known in the technology as Biological Oxygen Demand.

These and other objects are obtained by the use of a centrifugal separator. In the within invention the centrifugal separator slows down the flow of water in a chamber so that the particles are permitted to drop into a catch basin. In a sense, this might be termed the reverse of a centrifugal separator since the use of gravity is employed to obtain the "dropping out" of the particles when the liquid is slowed down. Another species of the invention is to provide an inner filter, the operation of which is based upon particle size instead of by gravity. This is explained in more detail hereinafter. The same principle is applied, however, in that the flow of the liquid is slowed down and caused to rise into a plurality of filter tubes which are circumscribed by filter aids.

For a more detailed explanation and description of this invention, reference is made to the following specifications and to the drawings, in which:

FIG. 1 is an elevational view of the front of the filter assembly.

FIG. 2 is a vertical cross-section view of the filter, taken along line 2—2 of FIG. 1.

FIG. 3 is a view in cross-section taken along line 3—3 of FIG. 2.

FIG. 4 is a view in cross-section taken along line 4—4 of FIG. 2.

FIG. 5 is a view in cross-section similar to FIG. 2 of an inner chamber of another species of the invention employing a plurality of filter tubes and filter aids.

Reference is made to the cross-section view in FIG. 2 along line 2—2 of FIG. 1. FIG. 2 shows the inner structure of the tank 1. The tank has an outer casing 1. There is an opening or inlet 2 within the flange 3 which protrudes from the surface of the tank 1 permitting the entry of fluid into the area of the middle chamber 4a.

A threaded rod 37 extends upwardly from the locking nut 28 at the top of the tank 1 about the conical shaped dome 27. There is a lever arm 8 connected to the locking nut 28 which assists in the turning thereof as will be explained hereinafter.

Near the bottom of the tank 1 is an inspection opening 22 which is normally plugged. The tank 1 is mounted on legs 25 which appear at the bottom thereof. A conical shaped funnel 12 is at the bottom of the tank 1 which may also be hereinafter called the feeding chute 12. There is a housing 15 connected to and with the chute 12 which is the housing for the packing worm 16. This housing 15 is connected to a residue discharge chamber 21. The outlet from the residue discharge chamber 21 is designated as 21a.

The lower chamber 10 is located beneath the middle chamber 4a. The thin shaped devices at 13 are the flow spoilers which appear as fins. The fins 13 are mounted on the bottom of the upper middle chamber 7 which is specially shaped and designed. Its lower surfaces draw closely downwardly towards one another in the shape of a truncated cone. Near the upper portion there is a reversal from the direction of the cone, whereby the surfaces flow upwardly towards the threaded rod 37. The upper portion of the chamber is fastened to the threaded rod 37. The rod 37 is connected to the upper portion of the inner chamber 7 either by welding or the like.

A flexible tube 30 extends from the upper portion of the chamber 7 through an opening in the tank 1. There is a coupler 14a welded to the casing 1 through which the flexible tube 30 extends and connects with the pipe 14. There is mounted preferably by threading to chamber 7 a swivel elbow 29 to which the flexible tube 30 is connected. The swivel elbow 29 enables the fluid to pass from the chamber 7 through the tubing 30 out into the pipe 14.

At the bottom of the tank 1, in FIG. 2, are shown the vertical baffle plates 11, which intersect each other and which are shown in detail in the view of FIG. 4 (which is a section along line 4—4 of FIG. 2). FIG. 4 enables the viewer to look down thereon.

There are helicoids 6 which circumscribe the chamber 7 and are welded to the inside of the tank 1, creating a path for the liquid to flow from the area at 4a to the area in the lower chamber at 10. The passage area between the helicoid ribs 6 increases as the liquid is propelled downward and outward thus decelerating the flow because the space between the ribs becomes larger in area towards the bottom of the chamber 7 which is conical in shape There is welded to chamber 7 three key-way brackets 9 which appear as protruding members. The bracket 9 extends so as to engage the vertical key brackets 32 of which there are three. There is an abutment 33 on each of the brackets 32 at their lower ends, which act as a stop to prevent the bracket 9 from going lower than the bottom of the bracket 32. The brackets 32 also prevents the chamber 7 from rotating inside the tank 1 when the threaded bushing 28 is rotated to lower or raise the position of chamber 7 which will be explained hereinafter.

There is below the tank 1 as stated previously and as shown in FIG. 1 but in more detail in FIG. 2, an assembly for collecting the particles that have been removed from the liquid and causing same to become packed. This unit comprises of a transmission system or unit 17 which converts energy into a rotary motion. It is connected to a motor not shown. There is a shaft 17a connected to the transmission unit 17. Integral with and extending from the shaft a is the packing worm 16 within the housing 15.

At the end of the worm 16 is a compacting and dehydrating chamber 43. The chamber 43 is an extension of housing 15 except that it has porous walls having openings 26 therein of which the inside is lined with fine screen 38. An outer shell or jacket 24 is attached by welding or the like to the housing 15. One end of this jacket 24 is flanged at 44 to receive the assembly of the residue discharge chamber 21 at flange 45.

An adjustable spring loaded plug 18 seals the end opening 46 of the chamber 43. At this opening 46 a back pressure on the residue slurry is employed for compacting and dehydrating the liquid. Back pressure is accomplished by the use of an adjusting bolt 19 attached to and exerting pressure on the spring 19a which in turn applies pressure on the plug 18 maintaining plug 18 securely in the opening at 46.

When the particles have built up enough pressure against the plug 18, this pressure is applied against the spring 19a and the particles drop out in a slurry form or in a semi solid state into the outlet 21a through the opening 46 where the plug 18 has been disengaged. The bolt 19 controls the amount of tension on the spring 19a.

There is surrounding the rod 37 in the top of chamber 7 a plurality of equi-distant spaced apart openings 31. These openings allow the floating off or draining off of the buoyant particles that did not drop into the lower chamber 10. (Some of the particles are lighter than water and will float.)

Another type of filtration is disclosed in the view of FIG. 5. This was referred to previously as using filter aids and filtering by size instead of gravity. Chamber 7 in FIG. 2 is referred to in FIG. 5 as chamber 39. It is to be observed that the shape of chamber 39 is different from that of chamber 7, in that it is not conical but cylindrical in its lower portion. There are a plurality of filter screen tubes 36 extending vertically from the upper conical portion of chamber 39. There is mounted between the upper conical portion of chamber 39 a disc type metal sheet 35 which acts as a support bracket for supporting the vertical tubes 36. The rod 40 is connected to the top of the chamber 39 at 42. Coupling 42 is so arranged that it controls the rotation of the rod 40 which in turn controls the elevation of the chamber 39 in the tank.

At the top of the tank 1 in the view of FIG. 5 is a ratchet type of assembly whereby the elevation or vertical movement of rod 40 (and therefore the vertical movement of chamber 39) may be controlled by the operation of the motor 41 in turning the ratchet type assembly 34 on the shaft 40.

In operation of the disclosure in FIG. 2 the fluid enters the inlet opening 2, passes into the middle area 4a just below the upper chamber 4. The fluid then passes through the helicoid ribs 6 down into the lower chamber 10. The velocity of the fluid has now been slowed down as it passes through the helicoid ribs 6. The flow of water is, of course, through the path of least resistance, which means that the only opening through which it can gain admission is up into the chamber 7. The fluid is almost motionless when it is in lower chamber 10 as it passes up into chamber 7. The heavy particles, because of gravity, are caused to drop down through the area between the vertical baffle plates 11. It is, of course, necessary for this liquid to pass through the Flow Spoilers or Fins 13 before the liquid gains admission into the inner chamber 7. The fins 13 act as a resistance to the circular flow of the liquid to decelerate the flow of the liquid to keep the flow as slow as possible. It is the theory of the slow motion of the liquid that enables the deleterious particles to drop down into the area of the vertical baffle plates 11. Let us follow the flow of the water and then we shall return to the explanation of where the particles go. After the water has passed through the lower chamber 7 it flows upwardly in chamber 7 to the outlet tube 30 and out into designated locations through the pipe 14.

There are openings 31 at the top of chamber 7 that can be seen in FIG. 3 which permit those particles which have not dropped out because they are the floating type particles and "lighter" than the liquid, to flow off into the upper chamber 4. These "lighter" particles that are now out of chamber 7 through the openings 31 flow through the opening or outlet 5 to a designated receptacle.

It is also to be noted that when the liquid flows into the area of 4a through the inlet opening 2, some of the particles that are the floating type will rise into the upper chamber 4 and will also flow out through the outlet 5 into the designated receptacle.

Now let us describe what happens to those heavy particles that drop down into the area of the baffle plates 11. The baffle plates 11 not only help slow the flow of the water but they also act as a catch or baffle for the heavy particles. These are dropped down into that area of the housing 12 which was referred to before as the "feeding chute". From the feeding chute 12 the particles enter the housing 15 in which the worm compacter 16 is located. The worm compacter 16 is rotating as a result of motion taken from the transmission unit 17. The rotation is such that all matter within the worm is threaded or turned towards the residue discharge chamber 21 through dehydrating chamber 43. Particles enter the chamber 43. The chamber 43 has a screen lining 38. The screen lining 38 is beneath the openings 26. The liquid that comes in with the particles drains off through the screen and through the openings 26 and drops out through the opening 23 in jacket 24. The plurality of particles builds up a heavy pressure against the assembly of the bolt 19, spring 19a and the plug 18. When the pressure is such that it overcomes the tension of the spring 19a, the plug 18 is pushed outwardly from opening 46 and the slurry of the particles drops out through 21a into the containers or other designated receptacles.

In order to adjust the flow of the liquid through the tank 1, it may be necessary to adjust the position of the inner chamber 7. As already stated there are keybrackets 32 located within the tank 1. There is also the key-way brackets 9. A threaded bushing 28 and its respective lever arm 8 for turning it, is located on top of the upper dome 27. The threads in the threaded bushing 28 are engaged with threads on the rod 37 so that the rod 37 is raised and lowered by rotating the threaded bushing 28 clockwise or counterclockwise respectively. The rod is attached to the top of the inner chamber 7 which results in raising and lowering it in the process of rotating the threaded bushing 28. To prevent chamber 7 from rotating, the bracket 9 will engage the bracket 32. Further, if the bracket 9 is lowered sufficiently it will be prevented from going any lower by the abutment 33 on the lower portion of bracket 32. These brackets 32 with the abutment 33 and with the keybracket 9 therefore control the amount of adjustment that may be obtained by the rotation of the threaded bushing 28 and confine the positioning of chamber 7 to that area within the spaces defined aforesaid.

The flow of the liquid in the tank 1 of FIG. 5 is substantially the same as in FIG. 2, with the exception of the filtration in chamber 39.

The liquid enters the inlet opening 2. The particles that float rise into the area at 4. The remaining liquid with the heavier particles flow from the area 4a opposite the opening 2 to the area 10 inside the tank 1. The lower portion of the tank 1 beneath the chamber 39 is similar to that shown in FIG. 2. Therefore, the liquid flows similarly into the area at 10, and the heavier particles drop down in between the vertical baffle plates 11 and drop into chute 12. The liquid rises in chamber 39 and takes the path of least resistance by flowing into the filter screen tubes 36 which have small openings therein. The liquid passes from the filter screen tubes 36 which are substantially cylindrical in shape into the openings 47 in the support disc 35 and into upper chamber 48. The liquid then flows from upper chamber 48 through the swivel elbow 29 and flexible pipe 30 as previously described for chamber 7.

The filter aids 49 circumscribe the screen 36. The filter aids 49 are placed into the chamber 39 by being pumped in with water through inlet 2 prior to the device being connected for operation. The filter aids 49 may be diatomaceous earth. This earth is porous. It circumscribes the screen openings in the screen tube 36 and, therefore, only substantially clear liquid can gain passage through the earth and screen. The design is such that particles of micro dimension will not pass through the screen tube 36. Therefore, those particles that do not drop down the chute 12 and do not float in upper chamber 4 will eventually cause the necessity of cleaning the debris that has formed around the tubes 36 at predetermined time intervals. This can be done by the raising and dropping of the inner chamber 39 by virtue of the ratchet arrangement at 40, 41 and 34 hereinbefore explained. The trauma of dropping will cause all the particles to be shaken loose as well as the diatomaceous earth and cause both the earth 49 and particles to drop down into the chute 12. It will, of course, be necessary to insert fresh and clean diatomaceous earth in the same manner as described to continue the operation.

We claim:

1. An anti-pollution device for removing deleterious particles from liquids comprising of a tank, an inlet to the said tank, a means in communication with said inlet for slowing down the flow of liquid, a means for floating off particles that are lighter than the liquid, a means for removing the particles heavier than the liquid and a means for carrying off the liquid to a designated receptacle, said means for slowing down the flow of the liquid comprises a plurality of helicoid ribs, an area below the said helicoid ribs, a plurality of fixed baffle plates beneath said area, an inner chamber within said helicoid ribs having an opening into said area whereby liquid passes through said helicoid ribs into said area and up into said chamber and whereby particles heavier than water drop down between said baffle plates, said inner chamber has a narrow opening at the bottom thereof and wherein the shape of said inner chamber is that of a double truncated cone with the narrowest portion at the bottom thereof and having at the top thereof another truncated cone shape with its dome at the top thereof.

2. An anti-pollution device as described in claim 1 wherein the inner chamber is connected to a threaded rod, said threaded rod connected through the top of the said tank, a bushing connected to the top of the said tank with threads for engagement to said rod, said bushing having means for turning same whereby said inner chamber may be lowered or raised within limits for the purpose of adjusting the velocity of the liquid in order to correlate with the density of the liquid.

3. An anti-pollution device as described in claim 2 wherein there are a plurality of key brackets mounted on the side of the inner chamber, a plurality of abutments mounted on the sides of the tank having stops at the bottom thereof, said key brackets protruding so as to make contact with said abutments and preventing the inner chamber from rotating within the said tank as the threaded bushing is turned causing said threaded rod to raise and lower said inner chamber, and said stops limiting the vertical distance in which the inner chamber may be lowered or raised.

4. An anti-pollution device as described in claim 1 having a chute beneath the baffle plates, said chute connected to a packing worm, said packing worm connected to a transmission unit having a rotary motion, said worm connected to a dehydrating chamber, said dehydrating chamber having means for removing liquid from particles located therein and means for releasing said particles from said dehydrating chamber.

5. An anti-pollution device as described in claim 2 having a chute beneath the baffle plates, said chute connected to a packing worm, said packing worm connected to a transmission unit having a rotary motion, said worm connected to a dehydrating chamber, said dehydrating chamber having means for removing liquid from particles located therein and means for releasing said particles from said dehydrating chamber.

6. An anti-pollution device as described in claim 1 having a chute beneath the baffle plates, said chute connected to a packing worm, said packing worm connected to a transmission unit having a rotary motion, said worm connected to a dehydrating chamber, said dehydrating chamber having means for removing liquid from particles located therein and means for releasing said particles from said dehydrating chamber, said packing worm having a threaded type flange about a rod, said threaded type flange being located within a housing, said housing connected to said chute, said dehydrating chamber having a screening means within same whereby liquid may pass through said screening means and out through openings in said dehydrating chamber, a jacket circumscribing said dehydrating chamber, an outlet in said jacket whereby the liquid passing through said screen and through said openings in said dehydrating chamber is permitted to be released from said jacket through said opening into a designated receptacle.

7. An anti-pollution device as described in claim 1 having a chute beneath the baffle plates, said chute connected to a packing worm, said packing worm connected to a transmission unit having a rotary motion, said worm connected to a dehydrating chamber, said dehydrating chamber having means for removing liquid from particles located therein and means for releasing said particles from said dehydrating chamber, said means for releasing said particles from said dehydrating chamber having a jacket circumscribing the dehydrating chamber, a threaded bolt having a spring means attached thereto, said threaded bolt mounted in the jacket of said dehydrating chamber, a plug, said plug attached to aid spring means on said bolt, an opening in said dehydrating chamber, said plug inserted in said opening under tension of said spring whereby when said particles build up in said dehydrating chamber under the pressure of the said worm, the said plug will be removed from said opening and the said particles under the pressure of said worm will be forced from said opening and out through an opening in said jacket.

8. An anti-pollution device for removing deleterious particles from liquid comprising a tank, an inlet to said tank, a means for floating off particles that are lighter than the liquid, a means for removing the particles heavier than liquid, a means for removing by size the particles that are of the same density as the said liquid, said means for removing by size the particles that are of the same density as the said liquid comprising an inner chamber, a plurality of filter screen tubes within said chamber, diatomaceous earth surrounding said filter screen tubes, said screen tubes connected to an outlet whereby said filtered liquid may be deposited in a designated area, a ratchet means, said ratchet means connected to said inner chamber, means for operating said ratchet means whereby said inner chamber may be oscillated up and down so that the diatomaceous earth may be shaken loose from said screen tubes and from said chamber, said packing worm having a threaded type flange about a rod, said threaded type flange being located within a housing, said housing connected to said chute, said dehydrating chamber having a screening means within same whereby liquid may pass through said screening means and out through openings in said dehydrating chamber, a jacket circumscribing said dehydrating chamber, an outlet in said jacket whereby the liquid passing through said screen and through said openings in said dehydrating chamber is permitted to be released from said jacket through said opening into a designated receptacle.

9. An anti-pollution device as described in claim 8 wherein said means for releasing said particles from said dehydrating chamber comprise a jacket circumscribing the dehydrating chamber, a threaded bolt having a spring means attached thereto, said threaded bolt mounted in the jacket of said dehydrating chamber, a plug, said plut attached to said spring means on said bolt, an opening in said dehydrating chamber, said plug inserted in said opening under tension of said spring whereby when said particles build up in said dehydrating chamber under the pressure of the said worm, the plug will be removed from said opening and the said particles under the pressure of said worm will be forced from said opening and out through an opening in said jacket.

* * * * *